United States Patent [19]
Racine et al.

[11] Patent Number: 5,592,060
[45] Date of Patent: Jan. 7, 1997

[54] SYSTEM FOR SENSING AN OBSTRUCTION BETWEEN A MOVABLE PANEL AND A STATIONARY PANEL FRAME

[75] Inventors: Lloyd G. Racine, Shelby Township; Edward J. Bratkowski, Harrison Township, both of Mich.

[73] Assignee: Webasto Sunroofs Inc., Rochester Hills, Mich.

[21] Appl. No.: 500,364

[22] Filed: Jul. 10, 1995

[51] Int. Cl.⁶ .............................. E05F 15/10; H01H 3/16
[52] U.S. Cl. ........................ 318/469; 49/27; 200/61.43
[58] Field of Search ................................ 318/264, 265, 318/266, 283, 286, 434, 466, 468, 469, 475; 49/26, 27; 200/61.43

[56] References Cited

U.S. PATENT DOCUMENTS

| | | |
|---|---|---|
| 3,133,167 | 5/1964 | Miller . |
| 3,693,026 | 9/1972 | Miller . |
| 3,855,733 | 12/1974 | Miller . |
| 4,051,336 | 9/1977 | Miller . |
| 4,273,974 | 6/1981 | Miller . |
| 4,317,970 | 3/1982 | Hafner et al. . |
| 4,621,223 | 11/1986 | Murakami et al. . |
| 4,920,241 | 4/1990 | Miller . |

*Primary Examiner*—Bentsu Ro
*Attorney, Agent, or Firm*—Cushman Darby & Cushman IP Group of Pillsbury Madison & Sutro LLP

[57] ABSTRACT

A sensing system is provided which senses an obstruction between a closure member and a frame, regardless of the direction of the input force to the sensor, such that when the obstruction is sensed to be between the closure member and the frame, the operation of the closure member can be controlled to prevent further closing of the closure member upon the obstruction. The sensing system includes a membrane switch assembly which changes resistance when a force component caused by the obstruction is exerted on the switch assembly.

23 Claims, 11 Drawing Sheets

SYSTEM FOR SENSING AN OBSTRUCTION BETWEEN A MOVABLE PANEL AND A STATIONARY PANEL FRAME

BACKGROUND OF THE INVENTION

The present invention relates to a sensing system, and, more particularly, to a sensing system including a sensor assembly for sensing an obstruction between a movable panel or closure member and a frame so as to prevent further movement of the panel upon the obstruction.

Many devices have motor driven panels which open and close upon actuation of a switch. For example, vehicles are provided with venting sunroofs. The sunroofs have a movable roof panel which is slidable between opened and closed positions in an opening formed in the roof of the vehicle as well as being pivotable about one end thereof to raise a rear edge of the roof panel a small amount above the stationary roof structure into a venting position. Conventionally, the movement of the panel is controlled by manually operating a switch disposed within the interior of the vehicle. To initiate movement of the panel from either in its fully opened or vented position, the operator engages the switch until the panel is in a closed position. Certain sunroofs include an express close operation wherein actuation of a switch and thereafter release of the switch will close the panel without the need to continuously digitally actuate the switch.

In certain circumstances, while closing a movable panel from a partially or fully opened position, a person or object in the way of the closing panel could become injured or damaged.

Sensing systems have been developed to sense when an obstruction is between a movable panel and a stationary frame during closing of the panel. One such system is disclosed in U.S. Pat. No. 4,621,223 to Murakami et al. which uses a sensor mounted along an edge of an opening for a door, window or roof panel. The sensor comprises a pair of conductive, metal strips mounted on an insulating sheet. A second insulating sheet is interposed between the metal strips and includes a plurality of openings therein. A resistor is connected between the metal strips to produce a nominal resistance. When a unidirectional force is applied to the sensor due to contact with an obstruction, the resistance value of the sensor is changed from its nominal value. This resistance change is detected which signals a controller to reverse rotation of a motor which drives the door, window or panel preventing damage to the obstruction. This conventional sensor is expensive to manufacture since two elongated, conductive metal strips must be provided. Further, these rigid metal strips tend to reduce the overall flexibility of the sensor and thus, may reduce the sensitivity thereof and may prohibit use of the sensor in other obstruction sensing applications. In addition, this sensor may not always actuate when contacting an obstruction, since the packaging containing the sensor may not adequately transmit a non-unidirectional input force to the sensor.

Accordingly, a need exists to provide an improved, cost effective sensing system which senses when an obstruction is between a movable panel and a stationary frame during closing of the panel.

SUMMARY OF THE INVENTION

An object of the present invention is to fulfill a need referred to above by providing a sensing system which senses an obstruction between a closure member or panel and a frame, such that when the obstruction is sensed to be between the panel and the frame, the operation of the panel can be controlled to prevent further closing of the panel upon the obstruction.

In accordance with the principles of the present invention, this objective is obtain by providing a system for detecting an obstruction disposed between a movable closure member and a stationary frame, the frame being mounted with respect to an opening, the closure member being of a size to close the opening and is mounted on the frame for movement between an opened position wherein at least a portion of the opening is exposed and a closed position. The system includes a drive assembly operatively associated with the closure member so as to move the closure member between the opened and closed positions thereof, control structure for controlling operation of the drive assembly, and sensor structure.

The sensor structure includes mounting structure including a base and a flexible member coupled to the base, the base being constructed and arranged to be coupled to either the panel and the frame. At least one switch assembly is mounted between the base and the flexible member. The switch assembly includes first and second elongate elements, each element including a flexible substrate and conductive particles applied to a surface of the substrate defining an electrical contact surface. Each of the first and second elements includes a surface opposing a respective electrical contact surface. Each said electrical contact surface has first and second ends with the second ends being coupled together through a resistor and the first ends are electrically connectable to the control structure.

An elongated spacer is provided and has a plurality of longitudinally spaced openings therein. The spacer is disposed between the first and second elements such that the openings extend generally transverse with respect to the electrical contact surfaces. Portions of the spacer between the openings contact the respective electrical contact surfaces of the first and second elements in such a manner that the electrical contact surfaces do not engage each other through the openings when the switch assembly is in an unstressed condition. An extent of the openings defines an active area of the switch assembly. The flexible member of the mounting structure covers the switch assembly and includes at least one actuating portion disposed adjacent the opposing surface of the second element and is cooperable with the active area of the switch assembly. The opposing surface of the first element is disposed adjacent the base.

The flexible member is constructed and arranged to deform when a force is exerted on a peripheral surface thereof and a force component is directed towards the switch assembly due to contact with an obstruction and to transmit the force component to the actuating portion regardless of input direction of an the force which causes the force component.

The actuating portion is constructed and arranged so that when a force component of a predetermined magnitude is transmitted thereto, the actuating portion causes the electrical contact surfaces of the first and second elements to engage each other through certain openings of the spacer thereby actuating the switch assembly and changing a resistance value of the switch assembly from a nominal resistance value. The control structure is constructed and arranged to detect the resistance value change and to control the drive assembly to prevent further closing movement of the closure member upon the obstruction.

Another object of the present invention is the provision of an apparatus of the type described, which is simple in construction, effective in operation by being extremely flexible, and economical to manufacture and maintain.

These and other objects of the present invention will become apparent during the course of the following detailed description and appended claims.

The invention may best be understood with reference to the accompanying drawings wherein an illustrated embodiment is shown.

DETAILED DESCRIPTION OF THE PRESENTLY PREFERRED EXEMPLARY EMBODIMENT

There are many devices which employ a panel which is movable or slidable with respect to a fixed frame. This invention relates to a sensing system for closure members or panels, which are driven by motors or the like, such as sliding doors, power windows, and sunroofs.

Figure 6A:
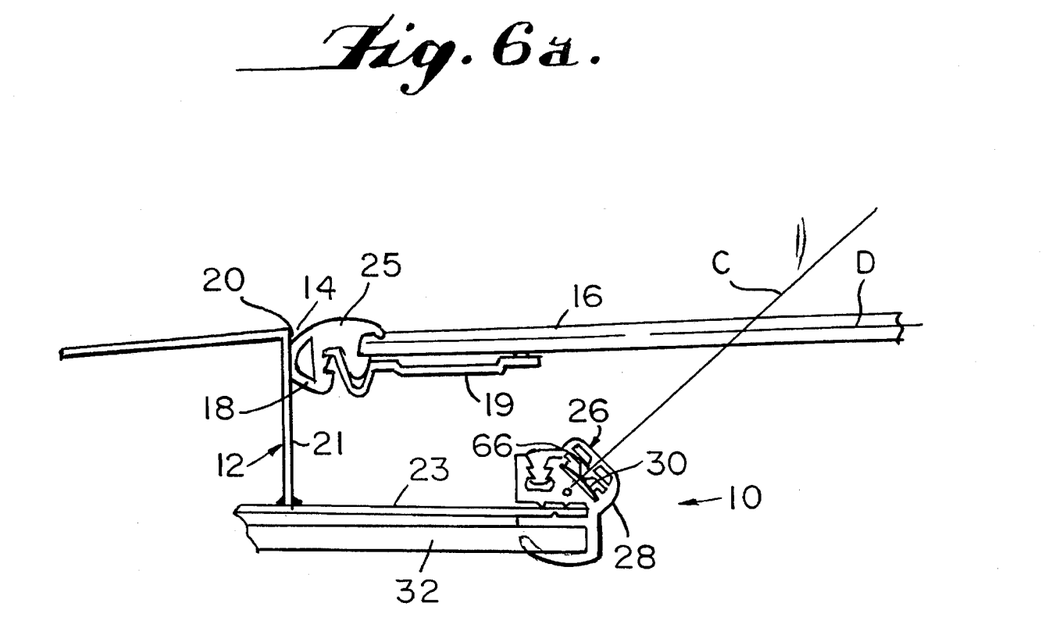
FIG. 6A is a partial side view of a vehicle roof having a sunroof panel shown with the sensing structure mounted to a portion of the vehicle frame near a front edge of the panel.

In the illustrated embodiment of FIG. 6A, the sensing system, generally indicated at 10, provided in accordance with the principles of the present invention, is employed in a vehicle sunroof assembly. The sunroof assembly comprises a stationary frame assembly 12 adapted to be mounted on the vehicle roof below an opening 14 therein. A closure member or sunroof panel 16, sized to close the opening 14, is mounted with respect to the frame assembly 12 for sliding movement between an opened position wherein a forward edge 18 of the panel 16 is disposed so as to expose at least a portion of the opening 14 and a closed position wherein the forward panel edge 18 is disposed adjacent a forward edge 20 of the frame assembly 12 thereby closing the opening 14. The panel 16 is supported peripherally by a panel frame 19. A seal member 25 is fixed to the edge of the panel 16 to provide a seal between the frame assembly 12 and the panel 16 when the panel 16 is in its closed position.

Figure 1:
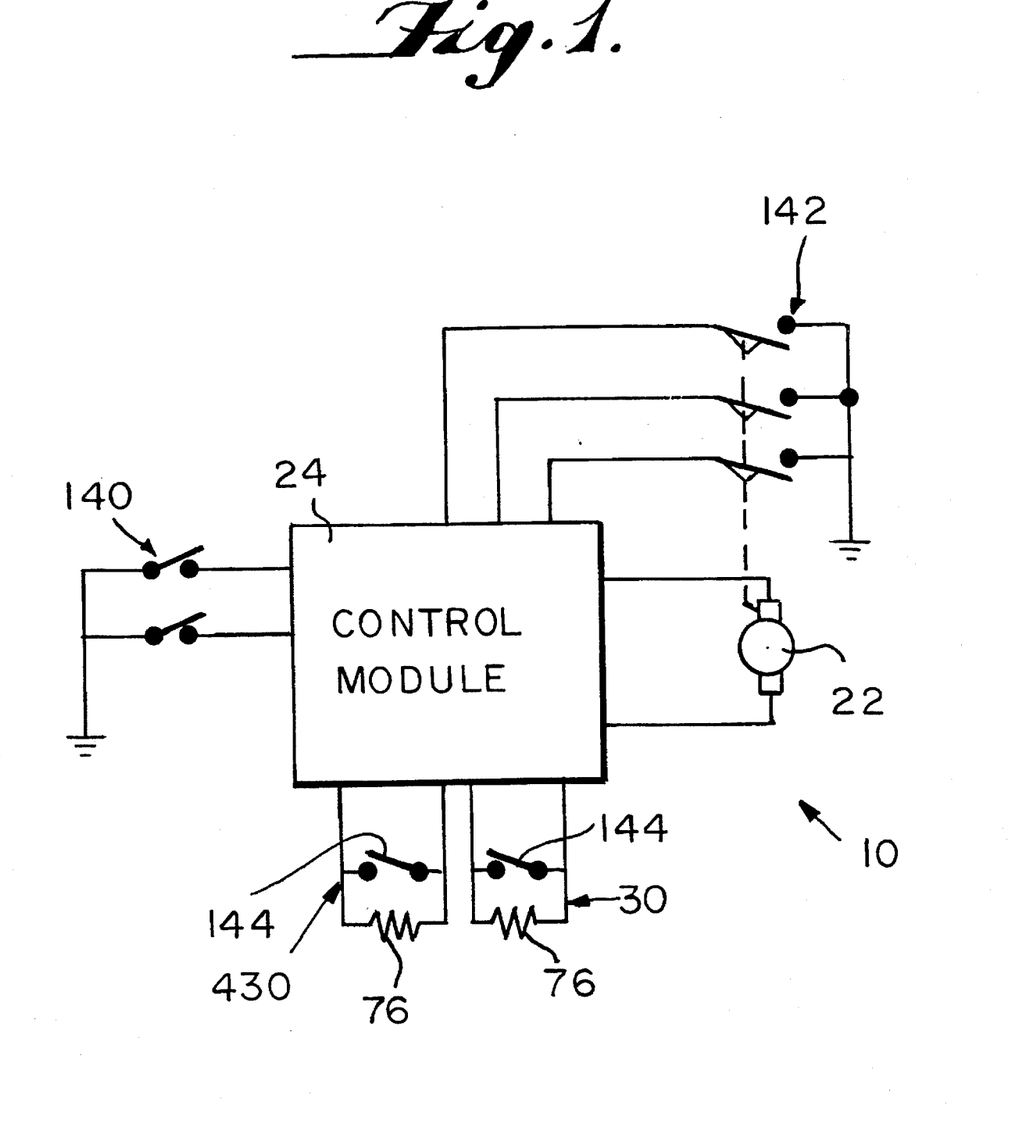
FIG. 1 is a block diagram of a sensing system provided in accordance with the principles of the present invention.

A panel drive assembly including a motor 22, shown schematically in FIG. 1, and conventional cables (not shown) for coupling to the panel is associated with the panel 16 to conventionally move the panel 16 between its fully opened, vented or closed positions, and a control module 24, defining control structure, is provided for controlling the motor 22. The frame assembly 12 includes a roof frame portion 21 welded to a sunroof sheet metal frame portion 23.

The sensing system 10 includes sensing structure, generally indicated at 26, comprising mounting structure 28 and a switch assembly 30. As shown in FIG. 6A, the sensing structure 26 is mounted to the sunroof frame portion 23 and cooperable with the vehicle headliner 32.

Figure 5:
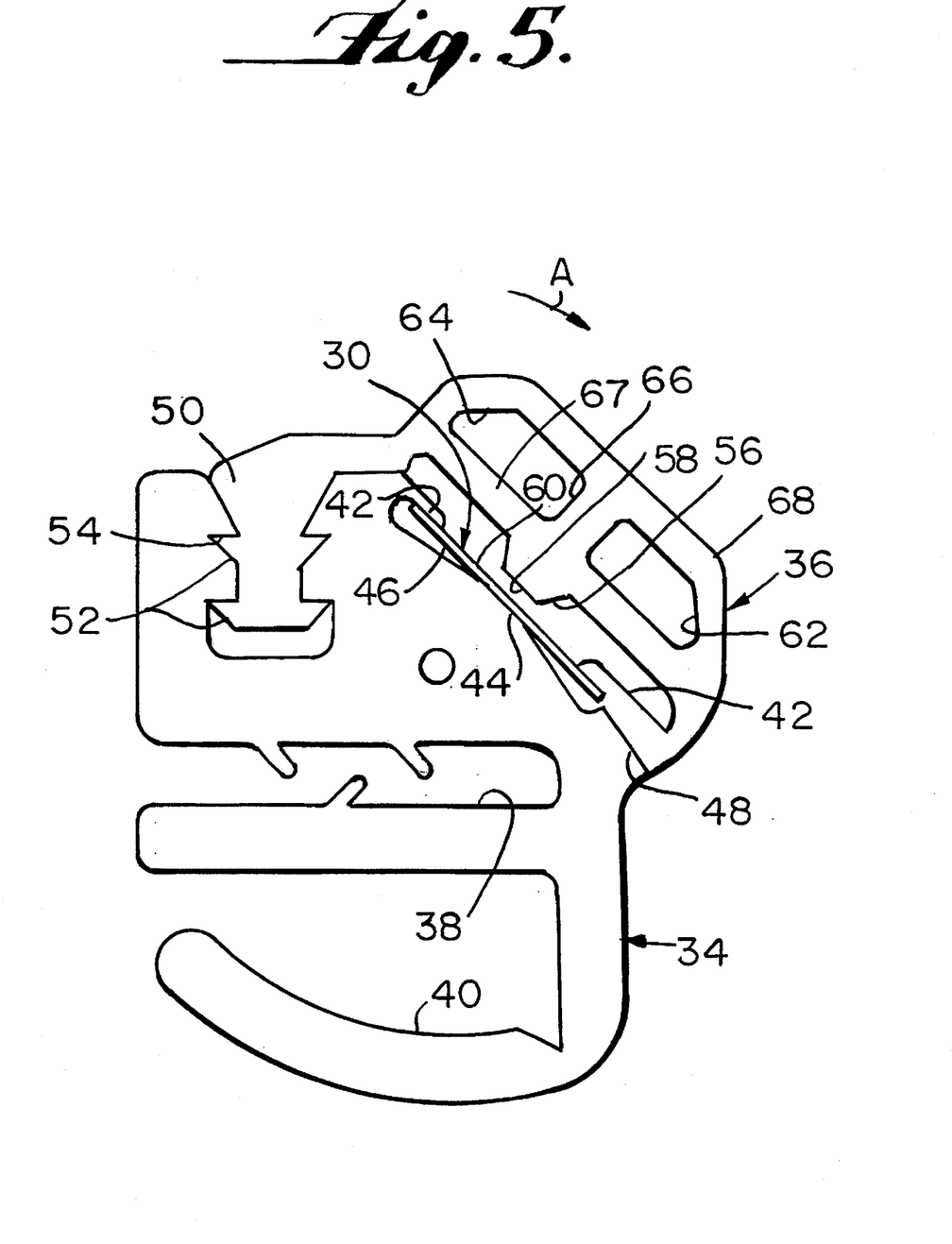
FIG. 5 is an enlarged end view of sensing structure of the sensing system including mounting structure housing the switch assembly FIG. 2.

With reference to FIG. 5, the mounting structure 28 of the sensing structure 26 includes an elongated base 34 and an elongated flexible member 36 coupled to the base 34. In the illustrated embodiment, the base 34 is includes a first channel 38 for frictionally receiving an edge of the sunroof frame portion 23 and a second channel 40 therebelow for frictionally receiving the headliner 32. The switch assembly 30 is mounted to the base 34 and secured thereto against movement towards the flexible member 36 by tabs 42. The base 34 includes a flat surface 44 extending the length thereof which defines a back-up surface for the switch assembly 30 such that a portion of the switch assembly 30 is backed rigidly at surface 46.

The flexible member 36 is coupled to the base 34 via a hinge connection 48 in such a manner that the switch assembly 30 may be assembled to the base 34 after the flexible member 36 is moved about the hinge connection 48 in the direction of arrow A in FIG. 5. After the switch assembly 30 is mounted to the base 34, the flexible member 36 is moved in a direction opposite direction A such that the switch assembly 30 is mounted between the flexible member and the base. The mounting structure 28 includes coupling structure for securing the flexible member 36 to the base 34 in an assembled condition. The coupling structure is in the form of mating parts. A retainer 50, including barbs 52, mates with a receiving portion 54 of the base 34 to secure the flexible member 36 to the base 34, with the switch assembly 30 covered by the flexible member 36.

As shown in FIG. 5, the flexible member 36 includes an actuating portion 56 extending longitudinally so as to be cooperable with the active area E of the switch assembly 30, as will be explained in detail below. The actuating portion terminates in a planar end surface 58 disposed adjacent surface 60 of the switch assembly 30, the function of which will become apparent below. The flexible member 36 includes two spaced channels 62 and 64, separated by a rib 66. Rib 66 is formed integrally with the actuating portion 56. Further, a rib 67 is provided which is disposed generally transverse with respect to rib 66. The ribs 66 and 67 couple the actuating portion to an inner periphery of the flexible member. With this construction, the flexible member 36 will deform when a force is applied to the outer peripheral surface 68 thereof, regardless of the force input direction. Thus, due to the ribs 66 and 67, a force component of the actual force inputted to the peripheral surface 68 of the flexible member 36 will be transmitted to the actuating portion 56 causing surface 58 thereof to contact surface 60 of the switch assembly 30 to activate the switch, as will be explained in detail below.

Figure 2:
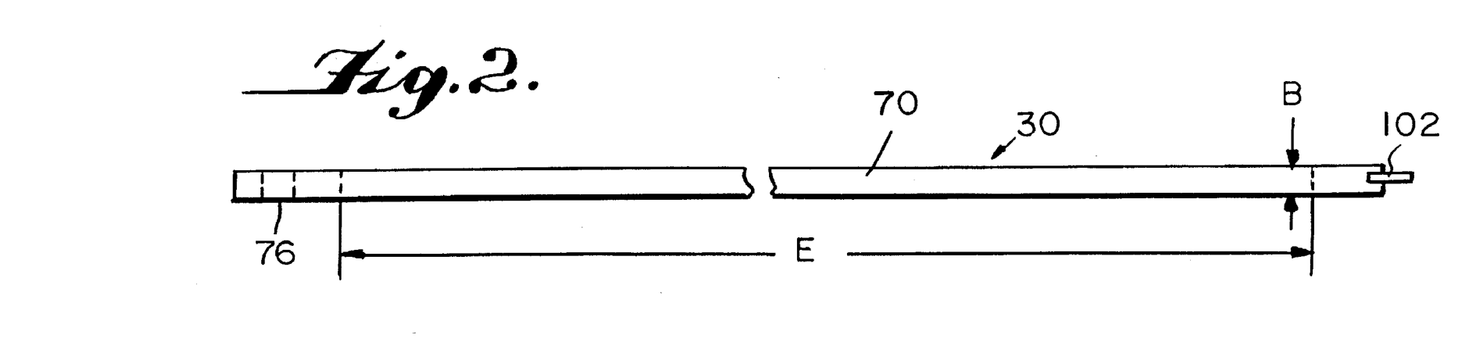
FIG. 2 is a plan view of switch assembly of the sensing system of FIG. 1.
Figure 4:
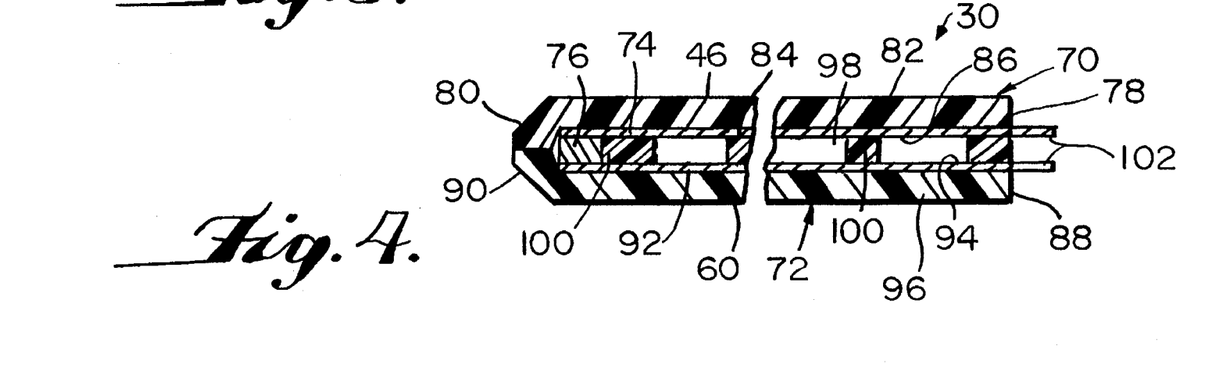
FIG. 4 is enlarged cross-sectional view of the switch assembly of FIG. 2, comprising a spacer sandwiched between two membrane elements.

With reference to FIGS. 2 and 4, the switch assembly 30 comprises first and second elongate membrane elements 70 and 72, a perforated spacer 74 sandwiched therebetween, and a resistor 76. FIG. 4 is an enlarged partial side view of the switch assembly 30 of FIG. 2. The first elongate membrane element 70 has first and second ends 78 and 80, respectively, and comprises an insulating member 82 having a conductive layer 84 thereon. The insulating member 82 is preferably composed of polyester. The conductive layer 84 is formed from a suspension of conductive particles in a curable ink applied to a surface of the insulating member 82. The conductive particles form the conductive layer 84 when cured. Thus, the first elongate membrane element 70 includes a conductive or electrical contact surface 86 and the surface 46 which opposes the contact surface 86.

The second elongate membrane element 72 is constructed identically as membrane element 70, and has first and second ends 88 and 90, a conductive layer 92, defining an electrical contact surface 94, and an insulating member 96, defining the surface 60 opposing the conductive or electrical contact surface 94. In the illustrated embodiment, for example, the height B of the switch assembly is approximately 0.354 inches, the length thereof is approximately 38.055 inches and the width thereof is approximately 0.020 inches. It can be appreciated that these dimensions may vary for the particular application.

Figure 3:
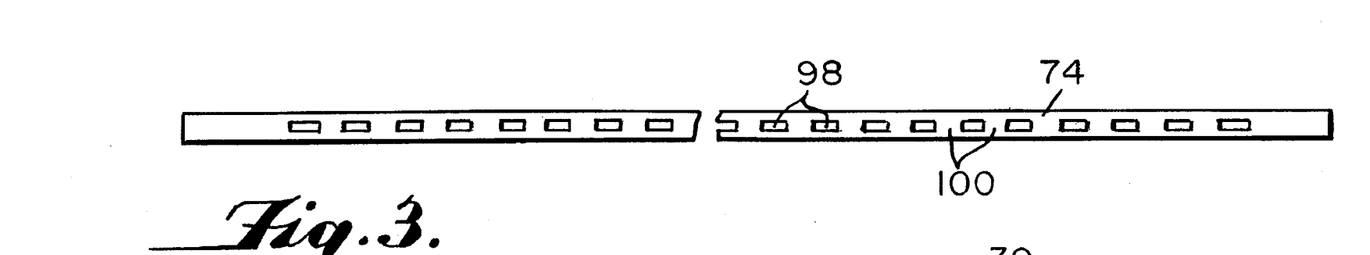
FIG. 3 is a perforated spacer of the switch assembly of FIG. 2.

As shown in FIG. 3, the insulating spacer 74 is an elongate member having a plurality of perforations or openings 98 therethrough. Openings 98 are spaced longitudinally defining lands 100 therebetween. The spacer 74 is preferably a thin plastic material. In the illustrated embodiment, the spacer 74 has a thickness of approximately 0.005 inches. Again, this dimension may vary for particular applications.

With reference to FIG. 4, the spacer 74 is sandwiched between the elements 70 and 72 so as to contact respective electrical contact surfaces 86 and 94 of the first and second elongate membrane elements in such a manner that the contact surfaces 86 and 94 do not engage each other when the switch assembly 30 is in an unstressed condition. The extent of said openings 98 in the longitudinal direction of the spacer 74 defines the active area E (FIG. 2) of the switch assembly 30. Thus, the switch assembly 30 can only be actuated in the active area E.

Ends of the contact surfaces near ends 80 and 90 of the membrane elements are coupled together via the resistor 76. Ends of the electrical contact surfaces near ends 78 and 88 of the membrane elements include lead solder tabs 102 for connecting the switch assembly 30 to an electrical supply of the control module 24.

Figure 6B:
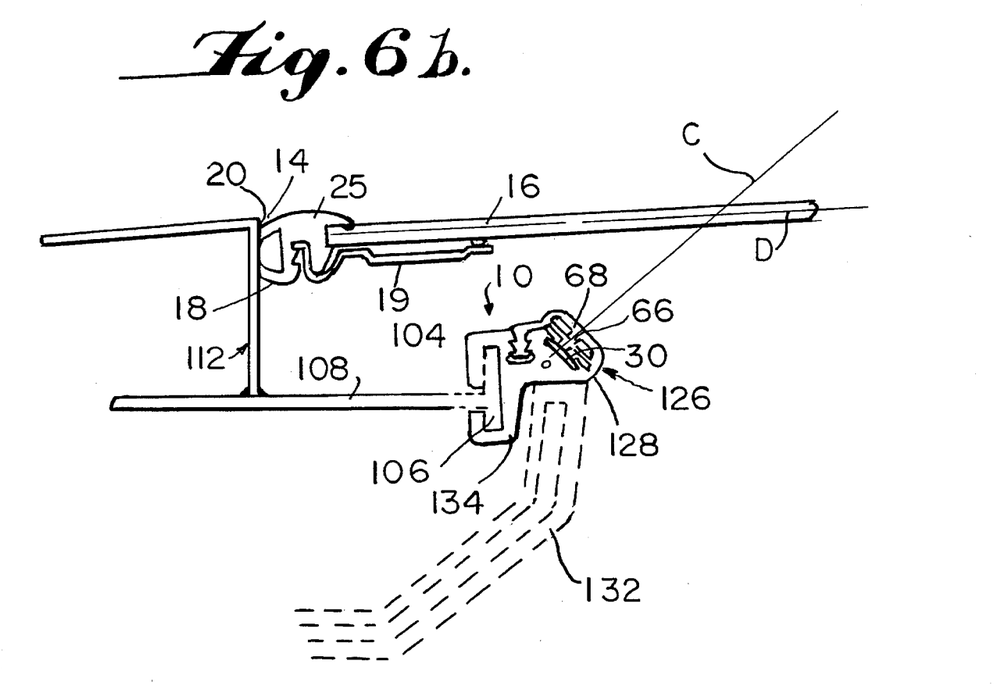
FIG. 6B is a partial side view of a second embodiment of the sensing structure shown mounted to a portion of the vehicle frame near a front edge of a movable sunroof panel.

FIG. 6B shows a second embodiment of sensing structure 126 mounted to a portion of the frame assembly 112 of a vehicle roof. As shown, the base 134 of the mounting structure 128 has been modified to accommodate mounting to the sunroof front rail 108 and to the headliner 132. Thus, the base 134 includes a channel 104 which receives flange 106 of the front rail 108 of the sunroof. As shown, the headliner 132 extends vertically and then horizontally. The base 134 rests on a distal end of the headliner 132.

With reference to FIGS. 4–6B, the use of the switch assembly 30 will be appreciated. In the illustrated embodiment, the opposing surface 46 of the first membrane element 70 is mounted adjacent to surface 44 of the base 34 so as to be supported or backed rigidly. The opposing surface 60 of the second membrane element 72 is disposed adjacent the actuating portion 56 of the flexible member 36.

The switch assembly 30 is electrically connected to control module 22 (FIG. 1) of the sensing system 10. User open/close switches, generally indicated at 140 are provided in the vehicle interior to initiate movement of panel 16. The system 10 further includes motor position switches, generally indicated at 142, associated with motor 20 for controlling various positions of the panel 16 in operation.

With reference to FIGS. 4, 5 and 6A, when an obstruction is disposed between the peripheral surface 68 of the sensing structure 26 and panel edge 18 during closing of the panel 16 so as to generate a force on the flexible member 36, the obstruction will press against the peripheral surface 68 of the flexible member 36. This causes a force component to be directed towards the switch assembly 30 and transmitted to the actuating portion 56 via central rib 66, regardless of the input direction of the actual force which causes the force component. The actuating portion 56 is constructed and arranged so that when a force component of a predetermined magnitude is transmitted thereto, the actuating portion 56 will engage surface 60 of the switch assembly 30 within the active area E of the switch assembly 30. Thus, surface 60 is moved towards rigidly backed surface 46 of the switch assembly 30, thereby causing the electrical contact surfaces 86 and 94 of the first and second elements 70 and 72, respectively, to engage each other through certain openings 98 of the spacer 74. This action closes switch, schematically illustrated at 144 in FIG. 1, to change a resistance value of the switch assembly 30 from a nominal resistance value.

The resistor 76 across the two elements 70 and 72 will permit the control module 22 to detect three distinct states. The nominal resistance value is detected when the switch assembly 30 is intact and the switch 144 is in an unactuated condition. A lower than nominal resistance value is detected when the switch assembly 30 is intact and the switch 144 is actuated or closed. Finally, a higher than nominal resistance value is detected anytime the electric continuity of the switch 144 is broken. The switch assembly 30 is disposed beneath the panel 16 such that the switch 144 will not actuate inadvertently when the panel 16 reaches its fully closed position. If the sunroof panel 16 is the type that has an express close operation, anytime the control module 22 detects a higher than nominal resistance value (a failure mode), the express close operation will be inhibited.

When the switch 144 is in a normal operating condition, if an obstruction is placed in the opening 14 while the panel 16 is closing, the panel 16 will close until the panel causes the obstruction to exert sufficient force on the sensing structure 26 as noted above, and the panel 16 will then stop and preferably reverse direction, thereby preventing further closing movement upon the obstruction.

In the illustrated embodiments of FIGS. 6A and 6B, the mounting structure 28, 128 is disposed relative to the panel 16 such that a longitudinal axis E of rib 66 is disposed at an angle of approximately 45 degrees with respect to a longitudinal axis D of the panel 16, which optimizes sensing sensitivity.

Figures 7A, 7B:
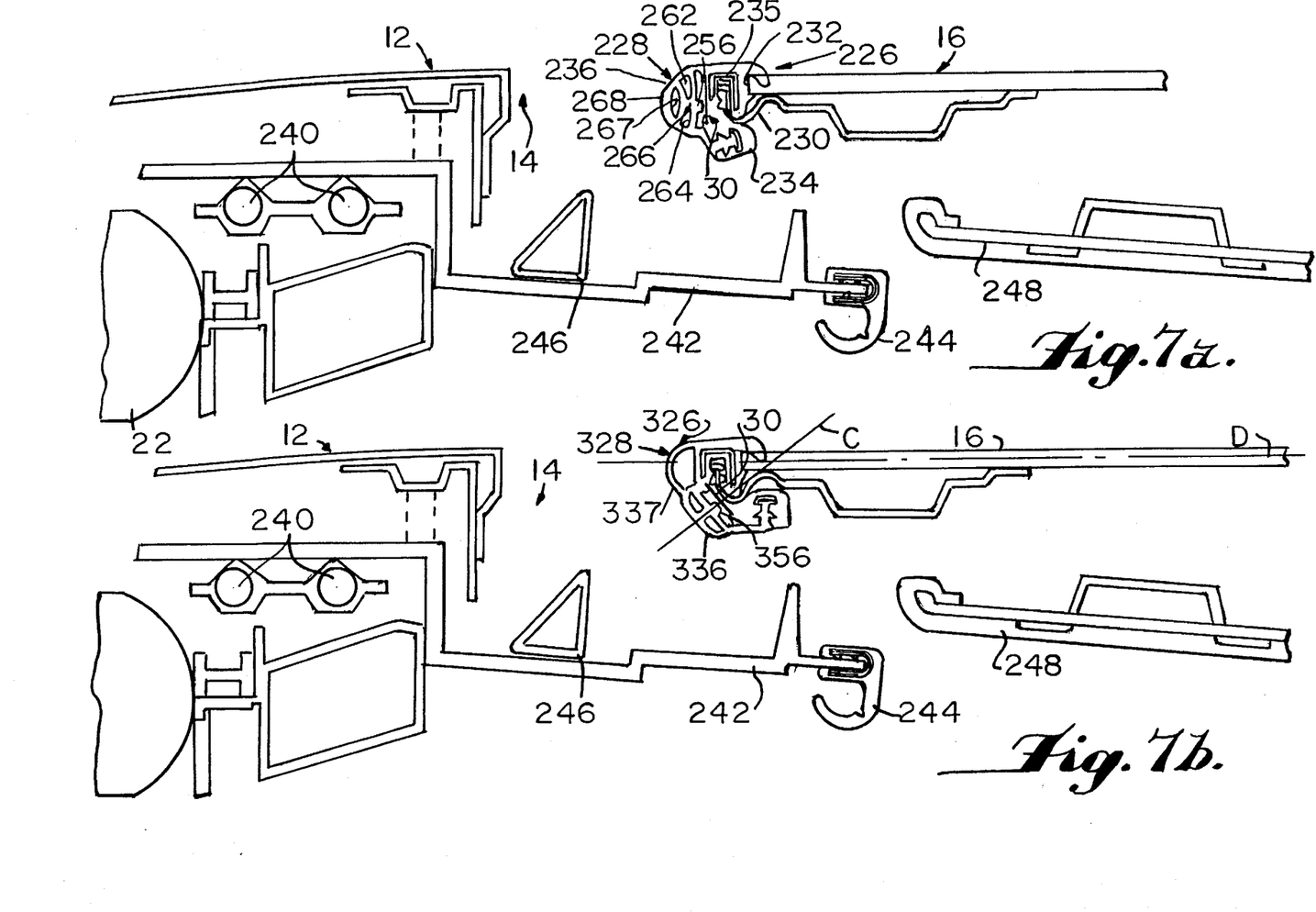
FIG. 7A is a side view of the sensing structure mounted to a slide-only type sunroof panel at a front edge thereof.
FIG. 7B is a side view of another embodiment of the sensing structure mounted to a movable sunroof panel at a front edge thereof.
Figure 7C:
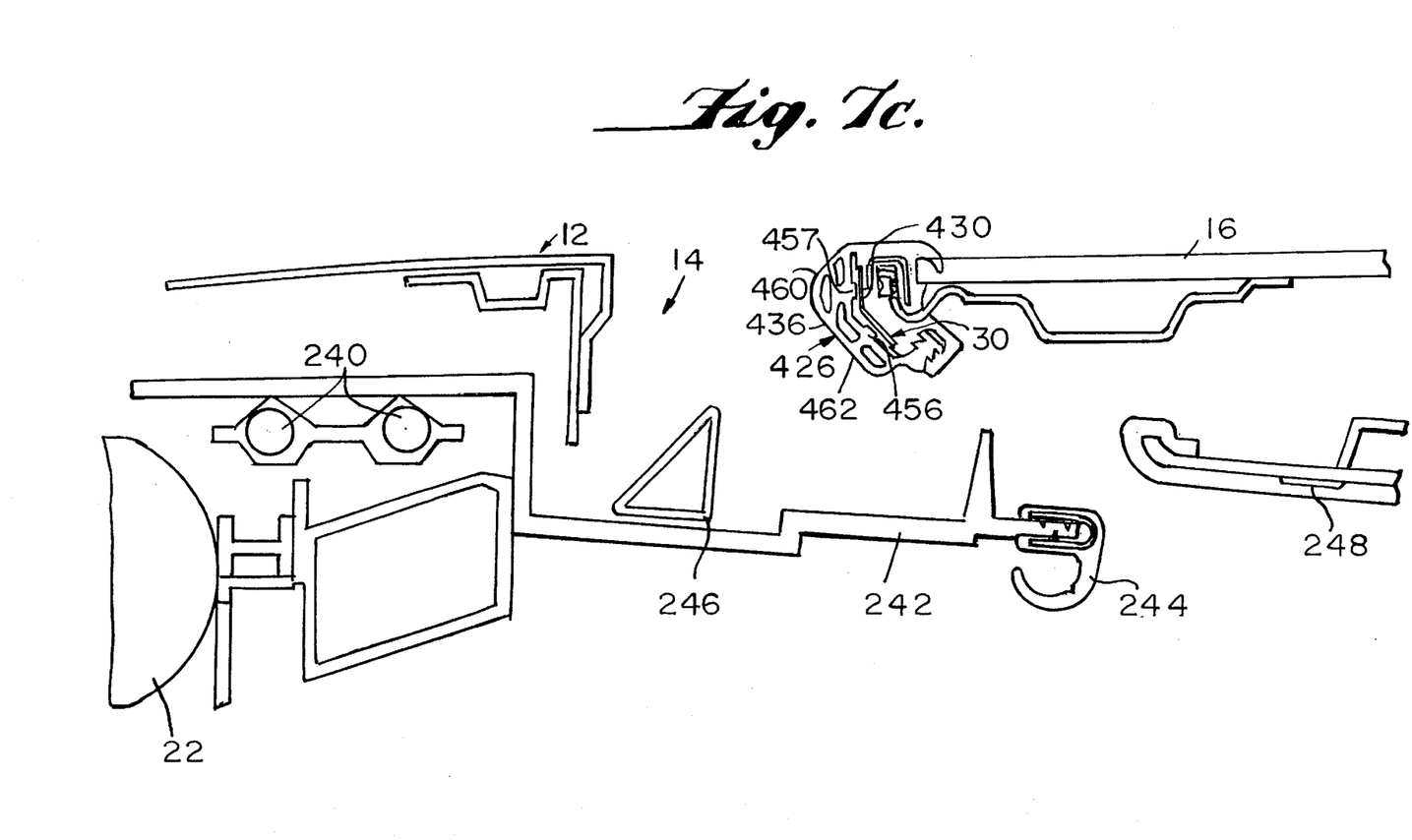
FIG. 7C is a side view of another embodiment of the sensing structure mounted to a movable sunroof panel at a front edge thereof.

Although the illustrated embodiments of FIGS. 6A and 6B show the sensing structure 26 mounted with respect to the fixed vehicle roof frame assembly 12, it can be appreciated that the sensing structure 26 may be mounted with respect to the moveable panel 16. In that regard, FIGS. 7A–7C show other embodiments of the sensing structure mounted to an edge of the panel 16. In each embodiment, the switch assembly 30 is identical to that disclosed above, however, the mounting structure has been modified to accommodate mounting of the sensing structure to the panel 16.

FIG. 7A shows a slide-only type sunroof which has no tilting or venting position. Thus, the mounting structure 228 of the sensing structure 226 is coupled to the peripheral frame 230 and to the panel edge 232. The base 234 of the mounting structure 228 is constructed and arranged to mount to the panel edge 232. A metal insert 235 is provided in the base for additional rigidity. The flexible member 236 of the mounting structure 228 includes two spaced channels 262 and 264 separated by a rib 266. Rib 266 is formed integrally with an actuating portion 256. A forward edge of the flexible member 236 includes a seal bulb 267 disposed generally in a central portion thereof. With this construction, the flexible member 236 will deform when a force is applied to the peripheral surface 268 thereof. Thus, due to the generally central rib 266, when a force is inputted to the peripheral surface 268 of the flexible member 36, a force component will be transmitted to the actuating portion 256 causing a surface thereof to contact a surface of the switch assembly 30 to activate the switch 144 in the manner discussed above.

FIG. 7A shows the relationship of the sensor structure 226 with the other vehicle components. The drive assembly includes a motor 22 which drives the sunroof panel 16 in the conventional manner via cables 240 of the assembly. A housing 242 extends below the panel 16 with a forward edge of the housing 242 defining a front gimp 244. A wind deflector 246 is carried by housing 242. A conventional sunshield 248 is mounted for movement with respect to the panel 16, rearwardly of the housing 242.

The sunroof panel shown in FIGS. 7B is of the sliding and tilting type. Thus, panel 16 is also pivotable about the forward end thereof to raise a rear edge of the panel 16 a small amount above the frame assembly 12 into a venting position (not shown). The sensing structure 326 is similar to that shown in FIG. 7A, in that it is mounted to the panel 16. However, the flexible member 236 of the mounting structure 328 is constructed and arranged such that an axis C of the actuating portion 356 is disposed generally 45 degrees with respect to a longitudinal axis D of the panel 16, to optimize sensor sensitivity. A seal bulb 367 is provided as a part of the flexible member to seal the panel 16 with respect to the frame assembly 12 when the panel 16 is in its closed position.

The sensing structure of FIG. 7B is shown mounted to a front edge of the panel 16 to sense the presence of an obstruction during sliding movement of the panel in closing the opening 14.

FIG. 7C shows yet another embodiment of the sensing structure 426 of the present invention. The sensing structure 426 is similar to that shown in FIG. 7B, in that it is mounted to the panel 16 with the actuating portion disposed at an angle of approximately 45 degrees with respect to the longitudinal axis of the panel 16. However, in the illustrated embodiment, the seal bulb of FIG. 7B has been replaced with a second actuating portion 457 which cooperates with a second switch assembly 430. Thus, a force inputted to surface 460 of the flexible member 436 causes a force component to be directed towards the switch assembly 430. This force component is transmitted to the switch assembly 430 via actuating portion 457. A force inputted to surface 462 of the flexible member 436 causes a force component to be directed towards the switch assembly 30. This force component is transmitted to the switch assembly 30 via actuating portion 456. FIG. 1 shows the switch assemblies 30 and 430 of FIG. 7C incorporated into the system 10.

Figure 8A:
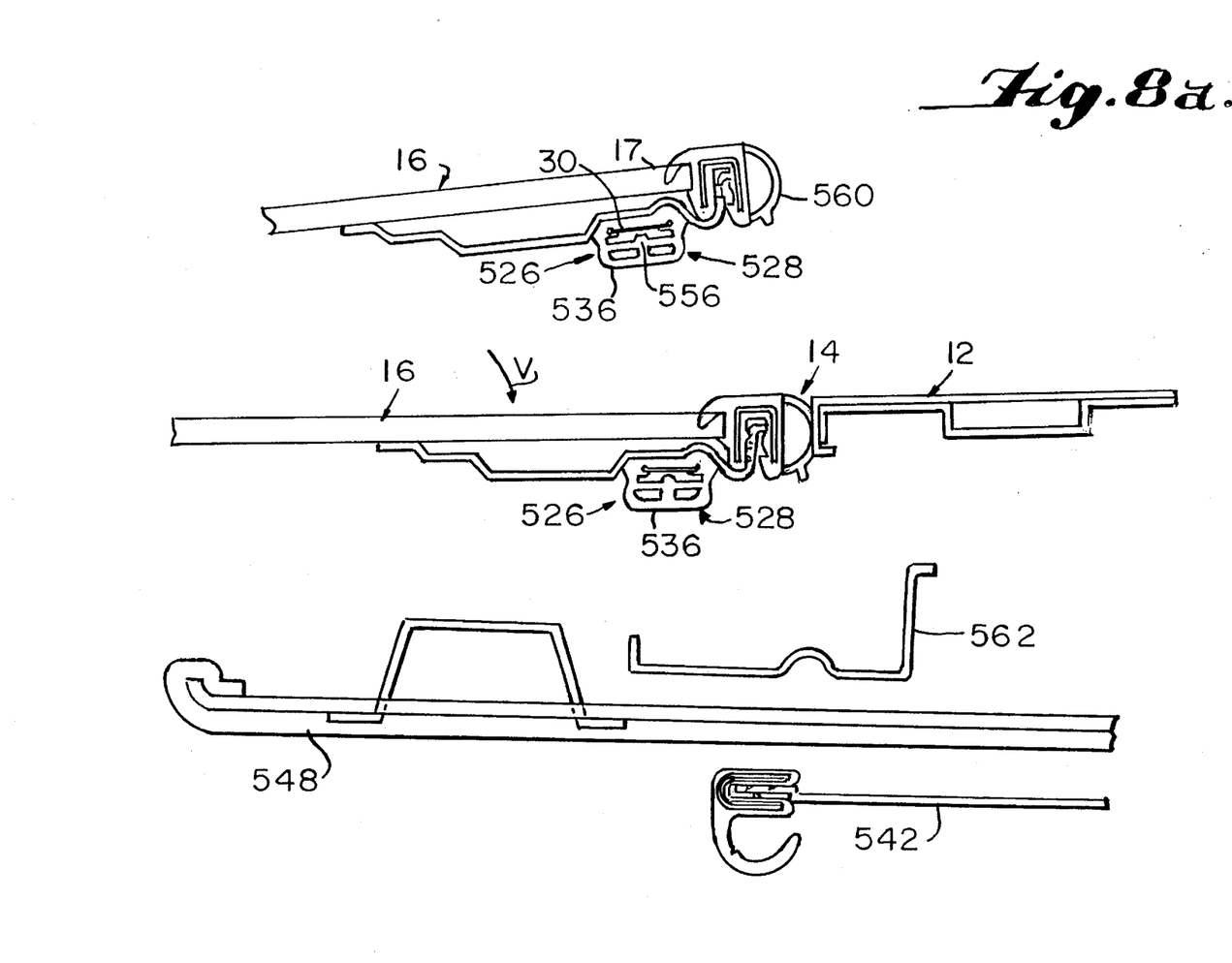
FIG. 8A is a side view of the sensing structure mounted to a venting type sunroof panel at a rear edge thereof.

FIG. 8A shows a venting-type sunroof employing the sensing structure 526 at a rear edge 17 of the panel 16 moving from a venting position to a closed position in the direction of arrow V. As shown, the mounting structure 528 of the sensing structure 526 is coupled to rear panel edge 17. The sensing-structure is generally identical to that shown in FIG. 5, but has been modified to be mounted to the rear edge of the panel 16. A seal member 560 provides a seal between the panel 16 and the frame 12 when the panel is in its closed position. The flexible member 536 is mounted on the underside of the panel 16 so as to detect an obstruction disposed in opening 14 as the panel 16 is moved in the direction of arrow V to its closed position, in the manner discussed above. A rain channel 562 is disposed beneath the seal member 562 and a sunshield 548 is movable with respect to the panel forwardly of the housing 542.

Figure 8B:
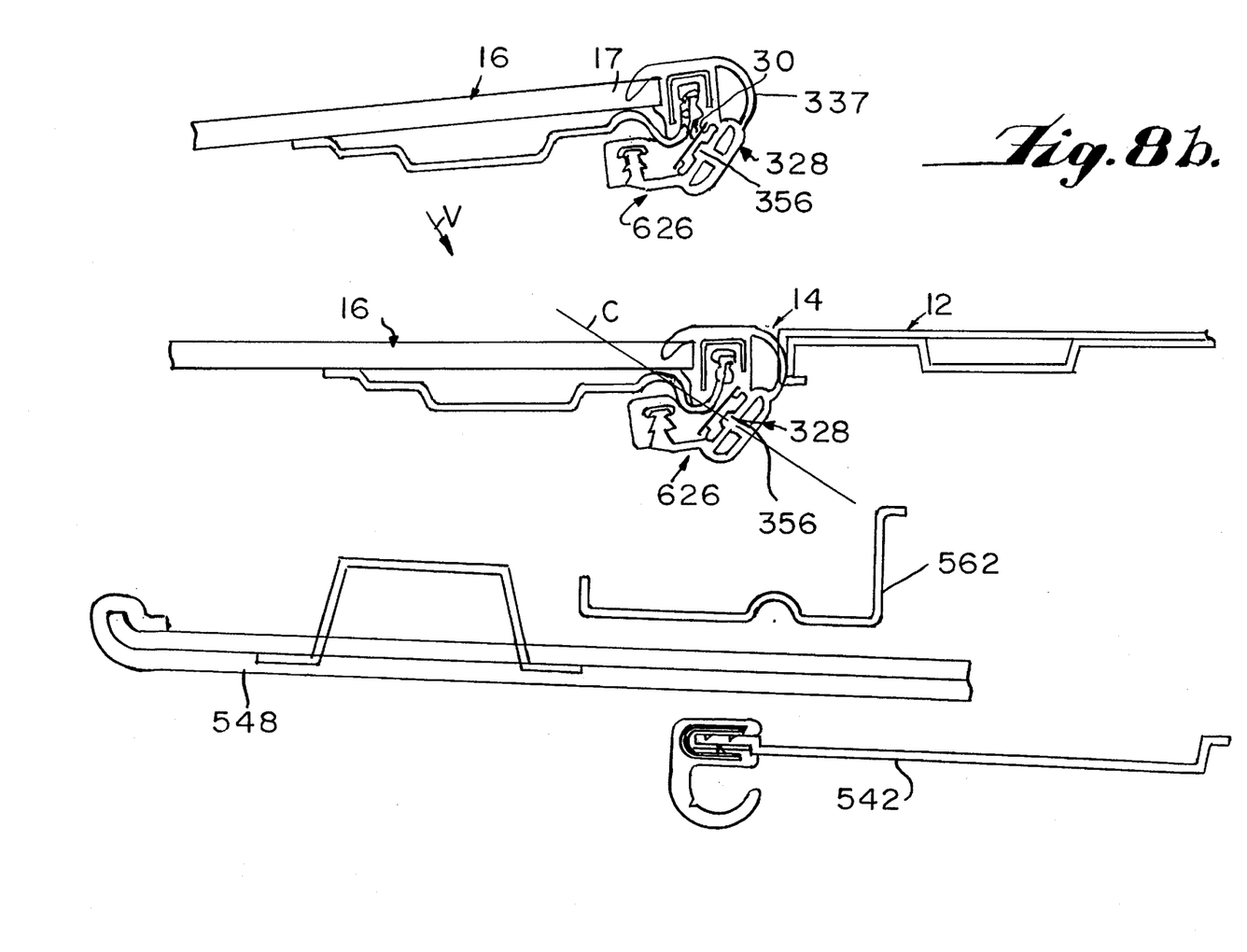
FIG. 8B is a side view of another embodiment of the sensing structure mounted to a movable venting-type sunroof panel at a rear edge thereof.

FIG. 8B shows another venting-type sunroof employing the sensing structure 626 at a rear edge 17 of the panel 16 moving from a venting position to a closed position in the direction of arrow V. The sensing structure 626 is identical to that shown in FIG. 7B and like parts are given the same numerals. Thus, the sensing structure is mounted on the panel 16 rear edge 17 so as to detect an obstruction disposed in opening 14 as the panel 16 is moved in the direction of arrow V to its closed position, in the manner discussed above.

Figure 8C:
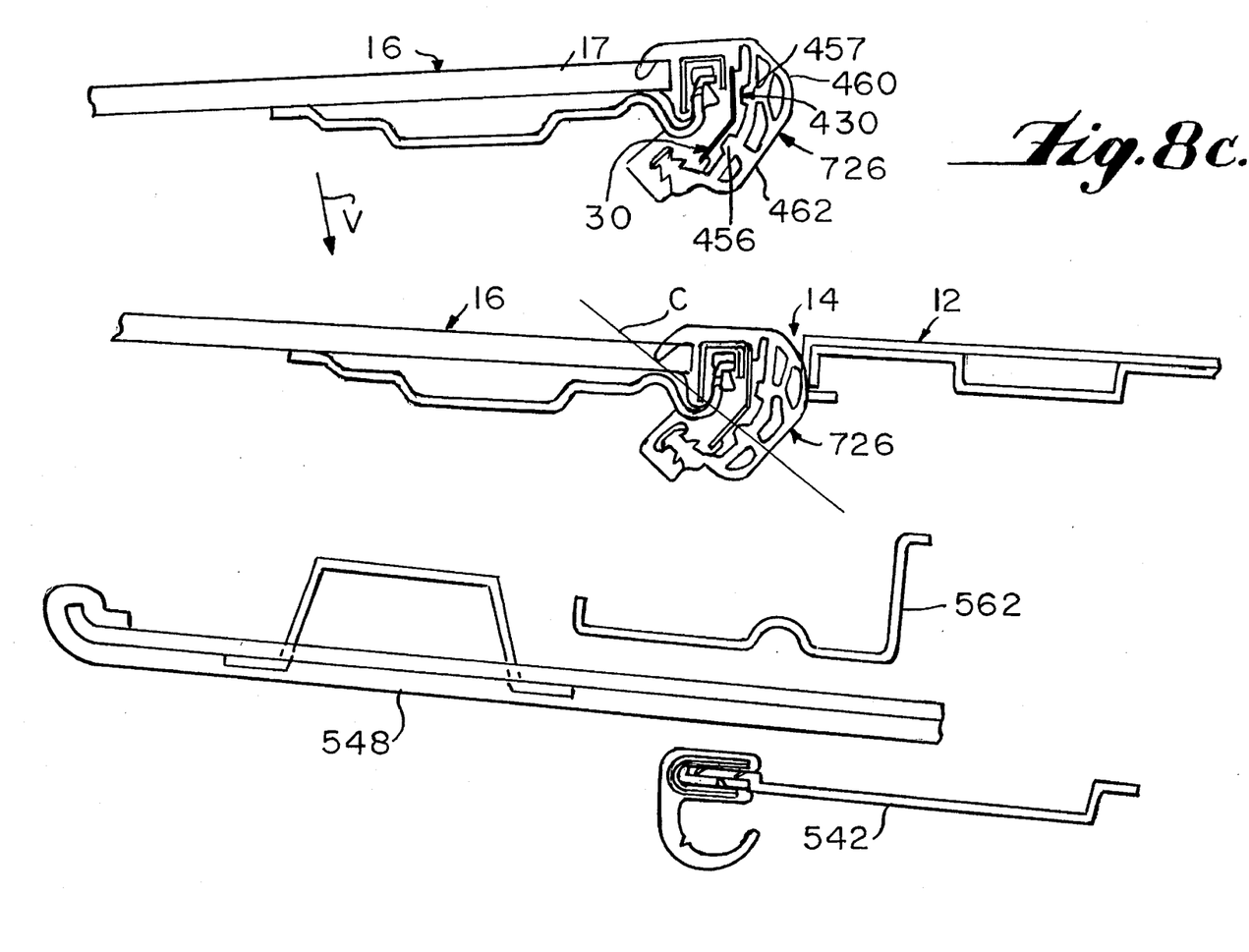
FIG. 8C is a side view of another embodiment of the sensing structure mounted to a movable venting-type sunroof panel at a rear edge thereof.

FIG. 8C shows yet another venting-type sunroof employing the sensing structure 726 at a rear edge 17 of the panel 16 moving from a venting position to a closed position in the direction of arrow V. The sensing structure 726 is identical to that shown in FIG. 7C and like parts are given the same numerals. As in the embodiments of FIGS. 8A and 8B, the sensing structure is mounted on the panel 16 rear edge 17 so as to detect an obstruction disposed in opening 14 as the panel 16 is moved in the direction of arrow V to its closed position.

Although the invention has been described for use with a vehicle sunroof, it can be appreciated that the system 10 of the invention can be employed in any arrangement wherein a closure member is moved by motor or the like with respect to a fixed frame. In that regard, FIGS. 9–12 show other contemplated uses of the system 10.

Figures 9, 10:
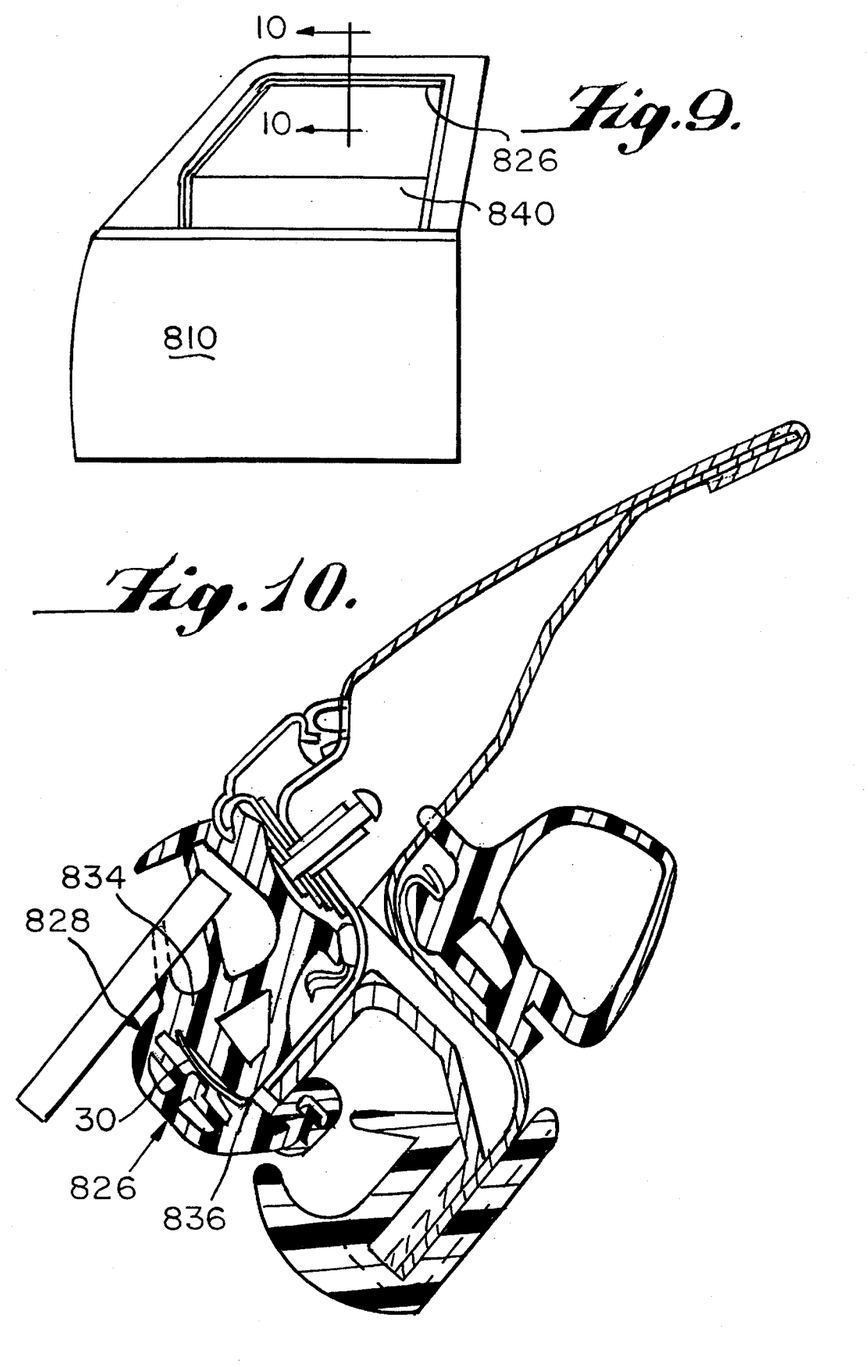
FIG. 9 is a side view of a vehicle door and window.
FIG. 10 is a sectional view taken along the line 10—10 of FIG. 9.

FIGS. 9 and 10 show the sensing structure 826 mounted with respect to a vehicle door 810 for sensing an obstruction during closing of a window 840 of the door 810. As shown, the base 834 of the mounting structure 828 has been modified to be mounted to the door frame. The flexible member 836 is generally identical to that shown in FIG. 5. The switch assembly 30 is disposed between the base 834 and the flexible member 836. It can be appreciated that the sensing structure 826 operates in the manner discussed above so as to sense an obstruction during closing of the window 840.

Figure 11:
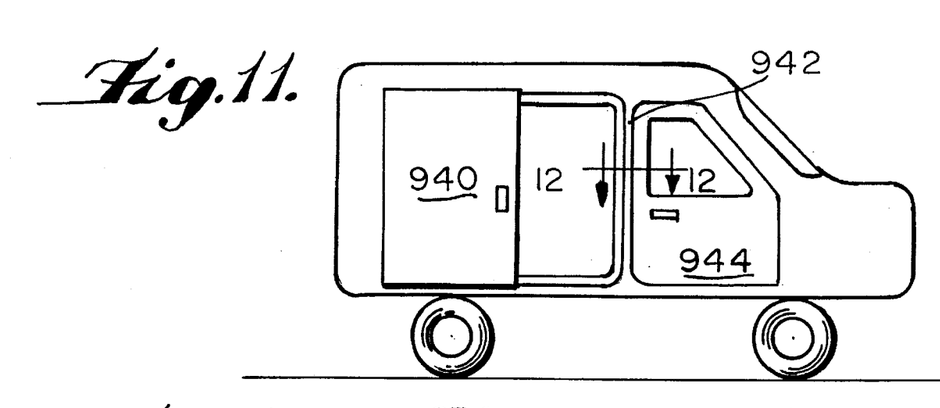
FIG. 11 is a side view of a vehicle having a sliding door.
Figure 12:
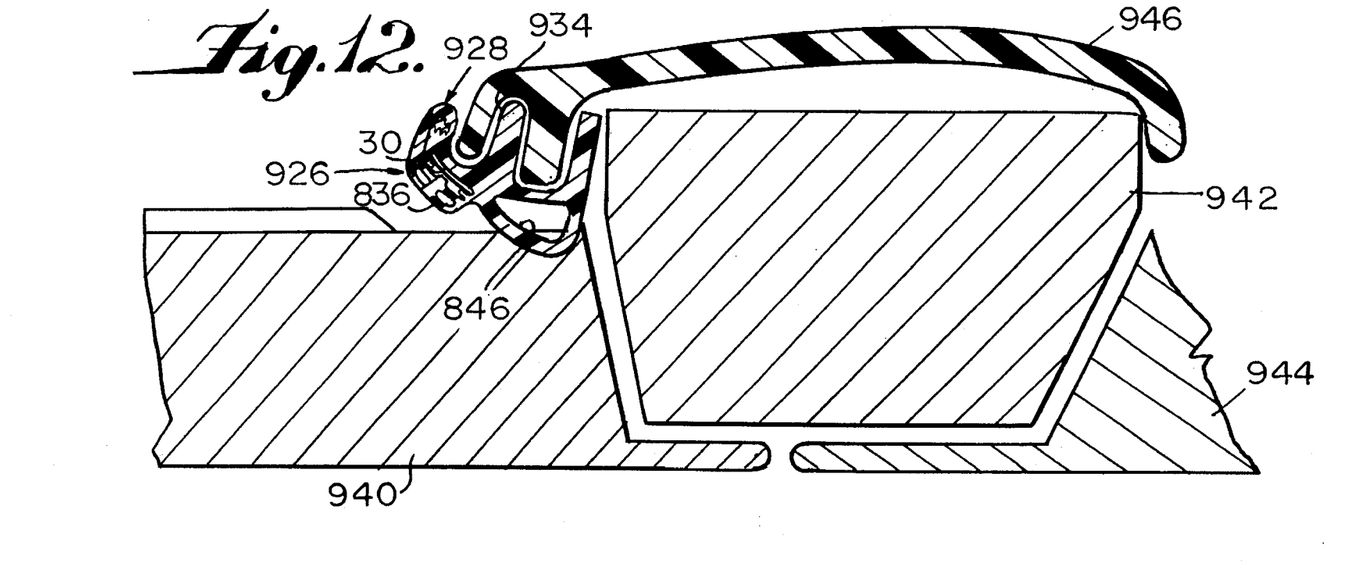
FIG. 12 is a cross-sectional view taken along the line 12—12 of FIG. 11, shown with the sliding door in a closed position.

FIGS. 11 and 12 show the sensing structure 926 mounted with respect to a vehicle sliding door 910 for sensing an obstruction during closing of the door 910. The vehicle includes a pillar 942 and a front door 944. As shown, the base 934 of the mounting structure 928 has been modified to be mounted to the interior trim 946 of the vehicle. The flexible member 936 is generally identical to that shown in FIG. 5, however, a seal bulb 946 is provided to form a seal with the door 940 when the door is closed. The switch assembly 30 is disposed between the base 934 and the flexible member 936. It can be appreciated that the sensing structure 926 operates in the manner discussed above so as to sense an obstruction during closing of the sliding door 940.

Although, in the illustrated embodiments, the switch assembly 30 is shown as being secured to the base 34 of the mounting structure, it can be appreciated that the switch assembly can be mounted on surface 44 of the actuating portion of the flexible member, or may be mounted so as to be spaced from surface 44 and from the base 34.

It is thus been seen that the objects of the present invention have been fully and effectively accomplished. It will be realized, however, that the foregoing preferred embodiment of the present invention has been shown and described before the purposes of illustrating the structural and functional principles of the present invention and is subject to change without departure from such principles. Therefore, this invention includes all modifications encompassed within the spirit of the following claims.

What is claimed is:

1. A system for detecting an obstruction disposed between a movable closure member and a stationary frame, the frame being mounted with respect to an opening, the closure member being of a size to close the opening and is mounted on the frame for movement between an opened position wherein at least a portion of the opening is exposed and a closed position, the system comprising:

a drive assembly operatively associated with the closure member so as to move the closure member between said opened and closed positions;

control structure for controlling operation of the drive assembly; and sensor structure comprising:

mounting structure including an elongated base and an elongated flexible member coupled to said base, said base being constructed and arranged to be coupled to one of said closure member and said frame; and at least one switch assembly mounted between said base and said flexible member, said switch assembly comprising:

first and second elongate elements, each said element comprising a flexible substrate and conductive particles applied to a surface of said substrate, said conductive particles defining an electrical contact surface, each of said first and second elements including a surface opposing a respective electrical contact surface, each said electrical contact surface having first and second ends with said second ends being coupled together through a resistor member and said first ends being connectable to an electrical supply of the control structure;

an elongated spacer having a plurality of longitudinally spaced openings therein, said spacer being disposed between said first and second elements such that said openings extend generally transverse with respect to said electrical contact surfaces, portions of said spacer between said openings contacting the respective electrical contact surfaces of said first and second elements in such a manner that said electrical contact surfaces do not engage each other through the openings when said switch assembly is in an unstressed condition, an extent of said openings in a longitudinal direction of said spacer defining an active area of said switch assembly, said flexible member of said mounting structure covering said switch assembly and including at least one actuating portion disposed adjacent said opposing surface of said second element and extending longitudinally of said flexible member so as to be cooperable with said active area of said switch assembly, said opposing surface of said first element disposed adjacent said base, said flexible member being constructed and arranged to deform when a force is exerted on a peripheral surface thereof causing a force component to be directed towards said switch assembly, due to contact with an obstruction, and to transmit the force component to said actuating portion regardless of input direction of the force which causes the force component, said actuating portion being constructed and arranged so that when a force component of a predetermined magnitude is transmitted thereto, said actuating portion causes the electrical contact surfaces of said first and second elements to engage each other through certain openings of said spacer thereby actuating said switch assembly and changing a resistance value thereof from a nominal resistance value, said control structure being constructed and arranged to detect said resistance value change and to control the drive assembly to prevent further closing movement of the closure member upon the obstruction.

2. The system according to claim 1, wherein said resistor member is a resistor constructed and arranged so as to permit said control structure to detect said nominal resistance value when said switch assembly is in an unactuated condition, a lower than nominal resistance value when said switch assembly is intact and actuated, and a higher than nominal resistance value when electrical continuity of said switch assembly is broken.

3. The system according to claim 1, wherein said opposing surface of said first element is coupled to said base so as to be backed rigidly thereby, whereby, when force is exerted on the peripheral surface of the flexible member and a force component is transmitted to the actuating portion of the flexible member, the actuating portion contacts said opposing surface of said second element thereby causing said electrical contact surfaces to engage one another through certain of said spacer openings.

4. The system according to claim 1, wherein said electrical contact surfaces comprise said conductive particles suspended in ink, applied and cured on said flexible substrate.

5. The system according to claim 3, wherein said flexible member includes a pair of spaced channels therein, said channels being separated by a first rib, said actuating portion being integral with said first rib and including a generally planar end surface which comes into contact with said opposing surface of said second element when the force is exerted on said flexible member, the flexible member including a second rib disposed generally transverse with respect to said first rib and coupled to said actuating portion, said first and second ribs being coupled to a periphery of said flexible member.

6. The system according to claim 3, wherein said base includes tabs constructed and arranged to contact said switch assembly and to secure said switch assembly with respect to said base so that said switch assembly does not move toward the flexible member.

7. The system according to claim 1, wherein said flexible member is coupled to the base via a hinge connection, said mounting structure including coupling structure constructed and arranged to secure said flexible member to said base with said switch assembly disposed therebetween.

8. The system according to claim 1, wherein said flexible member of said mounting structure is coupled to said base via a hinge connection in such a manner that said switch assembly may be accessed upon movement of said flexible member about said hinge connection, said flexible member including a retainer, said base including a receiving portion constructed and arranged to receive said retainer so as to secure said flexible member to said base with said switch assembly covered by said flexible member.

9. The system according to claim 1, wherein a longitudinal axis of said actuating portion is disposed at an angle of approximately 45 degrees with respect to a longitudinal axis of said closure member.

10. A system for detecting an obstruction disposed between a movable roof panel and a stationary roof frame, the roof frame being mounted on a vehicle roof below an opening therein, the roof panel being of a size to close the opening and is mounted on the roof frame for movement between an opened position wherein at least a portion of the opening is exposed and a closed position, the system comprising:

a drive assembly operatively associated with the panel so as to move the panel between said opened and closed positions;

control structure for controlling operation of the drive assembly; and sensor structure comprising:

mounting structure including an elongated base and an elongated flexible member coupled to said base, said base being constructed and arranged to be coupled to one of said panel and said frame; and at least one switch assembly mounted between said base and said flexible member, said switch assembly comprising:

first and second elongate elements, each said element comprising a flexible substrate and conductive particles applied to a surface of said substrate, said conductive particles defining an electrical contact surface, each of said first and second elements including a surface opposing a respective electrical contact surface, each said electrical contact surface having first and second ends with said second ends being coupled together through a resistor member and said first ends being connectable to an electrical supply of the control structure;

an elongated spacer having a plurality of longitudinally spaced openings therein, said spacer being disposed between said first and second elements such that said openings extend generally transverse with respect to said electrical contact surfaces, portions of said spacer between said openings contacting the respective electrical contact surfaces of said first and second elements in such a manner that said electrical contact surfaces do not engage each other through the openings when said switch assembly is in an unstressed condition, an extent of said openings in a longitudinal direction of said spacer defining an active area of said switch assembly, said flexible member of said mounting structure covering said switch assembly and including at least one actuating portion disposed adjacent said opposing surface of said second element and extending longitudinally of said flexible member so as to be cooperable with said active area of said switch assembly, said opposing surface of said first element disposed adjacent said base, said flexible member being constructed and arranged to deform when a force is exerted on a peripheral surface thereof causing a force component to be directed towards said switch assembly, due to contact with an obstruction, and to transmit the force component to said actuating portion regardless of input direction of the force which causes the force component, said actuating portion being constructed and arranged so that when a force component of a predetermined magnitude is transmitted thereto, said actuating portion causes the electrical contact surfaces of said first and second elements to engage each other through certain openings of said spacer thereby actuating said switch assembly and changing a resistance value thereof from a nominal resistance value, said control structure being constructed and arranged to detect said resistance value change and to control the drive assembly to prevent further closing movement of the panel upon the obstruction.

11. The system according to claim 10, wherein said sensor structure is constructed and arranged with respect to the movable roof panel and the stationary roof frame so as to detect an obstruction during closing of the panel from a venting position.

12. The system according to claim 11, wherein said mounting structure is coupled to a rear edge of the panel.

13. The system according to claim 11, wherein a longitudinal axis of said actuating portion is disposed at an angle of approximately 45 degrees with respect to a longitudinal axis of said panel.

14. The system according to claim 10, wherein said sensor structure is constructed and arranged with respect to the movable roof panel and the stationary roof frame so as to detect an obstruction during sliding movement of the panel to a closed position.

15. The system according to claim 14, wherein said mounting structure is coupled to a forward edge of the panel.

16. Sensor structure for detecting an obstruction disposed between a movable closure member and a stationary frame, the sensor structure comprising:

mounting structure including an elongated base and an elongated flexible member coupled to said base, said base being constructed and arranged to be coupled to one of said closure member and said frame; and at least one switch assembly mounted between said base and said flexible member, said switch assembly comprising:

first and second elongate elements, each said element comprising a flexible substrate and conductive particles applied to a surface of said substrate, said conductive particles defining an electrical contact surface, each of said first and second elements including a surface opposing a respective electrical contact surface, each said electrical contact surface having first and second ends with said second ends being coupled together through a resistor member and said first ends being connectable to an electrical supply of control structure;

an elongated spacer having a plurality of longitudinally spaced openings therein, said spacer being disposed between said first and second elements such that said openings extend generally transverse with respect to said electrical contact surfaces, portions of said spacer between said openings contacting the respective electrical contact surfaces of said first and second elements in such a manner that said electrical contact surfaces do not engage each other through the openings when said switch assembly is in an unstressed condition, an extent of said openings in a longitudinal direction of said spacer defining an active area of said switch assembly, said flexible member of said mounting structure covering said switch assembly and including at least one actuating portion disposed adjacent said opposing surface of said second element and extending longitudinally of said flexible member so as to be cooperable with said active area of said switch assembly, said opposing surface of said first element disposed adjacent said base, said flexible member being constructed and arranged to deform when a force is exerted on a peripheral surface thereof causing a force component to be directed towards said switch assembly, due to contact with an obstruction, and to transmit the force component to said actuating portion regardless of input direction of the force which causes the force component, said actuating portion being constructed and arranged so that when a force component of a predetermined magnitude is transmitted thereto, said actuating portion causes the electrical contact surfaces of said first and second elements to engage each other through certain openings of said spacer thereby actuating said switch assembly and changing a resistance value thereof from a nominal resistance value, said resistance valve change being capable of being detected by the control structure so that the control structure may prevent further closing movement of the closure member upon the obstruction.

17. The sensor structure according to claim 16, wherein said resistor member is a resistor constructed and arranged so as to permit the control structure to detect said nominal resistance value when said switch assembly is in an unactuated condition, a lower than nominal resistance value when said switch assembly is intact and actuated, and a higher than nominal resistance value when electrical continuity of said switch assembly is broken.

18. The sensor structure according to claim 16, wherein said opposing surface of said first element is coupled to said base so as to be backed rigidly, whereby, when the force is exerted on the peripheral surface of the flexible member and a force component is transmitted to the actuating portion of the flexible member, the actuating portion contacts thereby causing said electrical contact surfaces to engage one another through certain of said spacer openings.

19. The sensor structure according to claim 16, wherein said electrical contact surfaces comprise said conductive particles suspended in ink, applied and cured on said flexible substrate.

20. The sensor structure according to claim 18, wherein said flexible member includes a pair of spaced channels therein, said channels being separated by a first rib, said actuating portion being integral with said first rib and including a generally planar end surface which comes into contact with said opposing surface of said second element when force is exerted on said flexible member, the flexible member including a second rib disposed generally transverse with respect to said first rib and coupled to said actuating portion, said first and second ribs being coupled to a periphery of said flexible member.

21. The sensor structure according to claim 18, wherein said base includes tabs constructed and arranged to contacting said switch assembly and to secure said switch assembly with respect to said base so that said switch assembly does not move toward the flexible member.

22. The sensor structure according to claim 16, wherein said flexible member is coupled to the base via a hinge connection, said mounting structure including coupling structure constructed and arranged to secure said flexible member to said base with said switch assembly disposed therebetween.

23. The sensor structure according to claim 22, wherein said coupling structure includes a retainer defined on said flexible member opposite said hinge connection and a receiving portion in said base for receiving said retainer in a securing manner.

* * * * *